US009450223B2

(12) United States Patent
Song et al.

(10) Patent No.: US 9,450,223 B2
(45) Date of Patent: Sep. 20, 2016

(54) LITHIUM SECONDARY BATTERY

(71) Applicant: SAMSUNG SDI CO., LTD., Yongin-si, Gyeonggi-do (KR)

(72) Inventors: Keun-Won Song, Yongin-si (KR); Duck-Chul Hwang, Yongin-si (KR); Yong-Beom Lee, Yongin-si (KR); Jeong-Ki Ha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 855 days.

(21) Appl. No.: 13/657,819

(22) Filed: Oct. 22, 2012

(65) Prior Publication Data
US 2013/0202944 A1 Aug. 8, 2013

(30) Foreign Application Priority Data

Feb. 6, 2012 (KR) .................. 10-2012-0012027
Mar. 13, 2012 (KR) .................. 10-2012-0025722

(51) Int. Cl.
*H01M 2/16* (2006.01)
*H01M 4/62* (2006.01)

(52) U.S. Cl.
CPC .......... *H01M 2/1606* (2013.01); *H01M 2/166* (2013.01); *H01M 2/1613* (2013.01); *H01M 2/1666* (2013.01); *H01M 2/1673* (2013.01); *H01M 4/622* (2013.01); *H01M 4/623* (2013.01)

(58) Field of Classification Search
None
See application file for complete search history.

(56) References Cited

U.S. PATENT DOCUMENTS

| 6,899,974 | B2 | 5/2005 | Kamisuki et al. |
| 7,575,832 | B2 | 8/2009 | Hennige et al. |
| 8,142,920 | B2 | 3/2012 | Hennige et al. |
| 2001/0056157 | A1 | 12/2001 | Terry et al. |
| 2002/0076611 | A1 | 6/2002 | Palazzo et al. |
| 2002/0119377 | A1 | 8/2002 | Suzuki et al. |
| 2004/0062970 | A1 | 4/2004 | Nomura et al. |
| 2005/0084761 | A1 | 4/2005 | Hennige et al. |
| 2005/0255769 | A1 | 11/2005 | Henninge et al. |
| 2006/0078791 | A1 | 4/2006 | Hennige et al. |

(Continued)

FOREIGN PATENT DOCUMENTS

CN 1310483 A 8/2001
CN 102244223 A 11/2011

(Continued)

OTHER PUBLICATIONS

U.S. Office action dated Dec. 4, 2014, for cross reference U.S. Appl. No. 13/758,932, (19 pages).

(Continued)

*Primary Examiner* — Jonathan Crepeau
(74) *Attorney, Agent, or Firm* — Lewis Roca Rothgerber Christie LLP

(57) ABSTRACT

Disclosed is a lithium secondary battery that includes a separator including a coating layer including an inorganic compound, a polymer and an organic/inorganic bonding silane compound formed from an organic/inorganic bonding silane compound having a first reactive functional group; and an electrode contacting the coating layer, and including an active material and a binder formed from a binder having a second reactive functional group, wherein the first reactive functional group is reactive with the second reactive functional group, and the lithium secondary battery includes a chemical bond generated by reacting the first reactive functional group with the second reactive functional group.

17 Claims, 4 Drawing Sheets
(1 of 4 Drawing Sheet(s) Filed in Color)

(56) References Cited

U.S. PATENT DOCUMENTS

| | | | |
|---|---|---|---|
| 2007/0020524 A1 | 1/2007 | Kim et al. | |
| 2007/0020525 A1 | 1/2007 | Kim et al. | |
| 2008/0113266 A1 | 5/2008 | Park et al. | |
| 2008/0124631 A1 | 5/2008 | Fukui et al. | |
| 2008/0190841 A1 | 8/2008 | Pascaly et al. | |
| 2009/0098464 A1 | 4/2009 | Ichikawa et al. | |
| 2011/0003209 A1 | 1/2011 | Katayama et al. | |
| 2012/0301774 A1 | 11/2012 | Jiang et al. | |
| 2013/0280584 A1 | 10/2013 | Matsumura | |

FOREIGN PATENT DOCUMENTS

| | | | |
|---|---|---|---|
| EP | 1746674 A1 | | 1/2007 |
| EP | 1926163 A1 | | 5/2008 |
| EP | 1 955 756 A1 | | 8/2008 |
| JP | 2000-080187 | | 3/2000 |
| JP | 2007-311151 A | | 11/2007 |
| JP | 2009-193743 A | | 8/2009 |
| KR | 10-2007-0105320 | | 10/2007 |
| KR | 10-2008-0017114 | * | 2/2008 |
| KR | 10-2011-0104791 | | 9/2011 |
| WO | WO 98/50479 A1 | | 11/1998 |
| WO | WO 00/64992 | | 11/2000 |
| WO | WO 03/073534 A2 | | 9/2003 |
| WO | WO 2004/021477 A1 | | 3/2004 |
| WO | WO 2004/021499 A2 | | 3/2004 |
| WO | WO 2004/049471 A2 | | 6/2004 |
| WO | WO 2005/038959 A1 | | 4/2005 |
| WO | WO 2007/129842 A1 | | 11/2007 |
| WO | WO 2010/135248 A1 | | 11/2010 |
| WO | WO 2012/046843 A1 | | 4/2012 |
| WO | WO 2012/073996 A1 | | 6/2012 |

OTHER PUBLICATIONS

U.S. Advisory dated Jan. 5, 2015, for cross reference U.S. Appl. No. 13/657,583, (6 pages).

U.S. Office action dated Mar. 10, 2015, for cross reference U.S. Appl. No. 13/657,583, (20 pages).

Dow, A Guide to Silane Solution, Dow Corning, (2005), (30 pages).

Dow, Silane Cross Reference Guide www.SISIB.com; www.PowerChemCorp.com; (3 pages).

Machine English Translation of JP 2007-311151, Patent Abstracts of Japan, 31 pages.

European Search Report dated Mar. 28, 2013, issued for European Patent Application No. 12198939.6, 12 pages.

English Machine Translation of Japanese Publication No. 2009-193743 A listed above, 22 pages.

ShinEtsu, *Comprehensive Products Data Guide*, (2005), 48 pages.

U.S. Office action dated Oct. 23, 2014, for cross reference U.S. Appl. No. 13/657,583, (13 pages).

EPO Search Report dated Jul. 5, 2013 for European Patent application 13157294.3, (10 pages).

U.S. Office action dated May 8, 2014, for cross reference U.S. Appl. No. 13/657,583, (16 pages).

U.S. Office action dated May 9, 2014, for cross reference U.S. Appl. No. 13/758,932, (13 pages).

Patent Abstracts of Japan, and English machine translation of Japanese Patent application 2000-080187 dated , (9 pages).

SIPO Office action dated Jan. 6, 2016, with English translation, corresponding to Chinese Patent application 201310038424.2, (9 pages).

U.S. Notice of Allowance dated Nov. 12, 2015, for cross reference U.S. Appl. No. 13/758,932, (6 pages).

U.S. Notice of Allowance dated Sep. 8, 2015, for cross reference U.S. Appl. No. 13/758,932, (7 pages).

U.S. Advisory Action dated Nov. 5, 2015, for cross reference U.S. Appl. No. 13/657,583, (3 pages).

U.S. Office action dated Aug. 11, 2015, for cross reference U.S. Appl. No. 13/657,583, (21 pages).

Rabilloud, G., *Structure property relationships*, Chapter 3, Polymides in Electronics, High Performance Polymers, (1999), Institut Francais Du Petrole Publications, pp. 96-97.

U.S. Notice of Allowance dated Feb. 25, 2016, for cross reference U.S. Appl. No. 13/758,932 (6 pages).

English translation of SIPO Office Action, including Search Report, dated Mar. 30, 2016, corresponding to Chinese Patent application 201310086278.0 (9 pages).

* cited by examiner

LITHIUM SECONDARY BATTERY

CROSS-REFERENCE TO RELATED APPLICATIONS

This application claims priority to and the benefit of Korean Patent Application Nos. 10-2012-0012027 and 10-2012-0025722 filed in the Korean Intellectual Property Office on Feb. 6, 2012, and Mar. 13, 3012, respectively, the entire content of each of which is incorporated herein by reference.

BACKGROUND

1. Field

A lithium secondary battery is disclosed.

2. Description of the Related Art

A non-aqueous lithium secondary battery typically includes a separator made of a porous insulating film, interposed between positive and negative electrodes, and the pores of the film are impregnated by an electrolyte including a lithium salt dissolved therein. The non-aqueous lithium secondary battery has excellent initial high-capacity and high energy density characteristics. However, when the positive and negative electrodes therein are repetitively contracted and expanded during the charge and discharge cycles and, thus, react with a separator or an electrolyte, the non-aqueous lithium secondary battery may be easily deteriorated, which may result in internal and external short circuits and rapid increases in the temperature of the battery. When the temperature of the battery rapidly increases as aforementioned, the separator fuses and is rapidly contracted or destroyed and, thus, can be short-circuited again.

In order to prevent this problem, separators are formed of a porous polyethylene film having excellent shutdown characteristics, easy handling, and low cost. In those cases, however, the shutdown results in a separator that is partly fused and thus, closes pores and cuts off the current, when the temperature of the battery increases due to overcharge, external or internal short circuit, and the like.

In addition, an attempt has been made to improve safety of the non-aqueous lithium secondary battery by improving heat resistance of an electrode material for a separator and the like and in particular, to secure safety even when a separator therein is sharply contracted or destroyed.

SUMMARY

Aspects of embodiments of the present invention are directed to a lithium secondary battery capable of improving cycle-life characteristics, strength, and high temperature stability.

According to one embodiment of the present invention, a lithium secondary battery includes a separator including a coating layer, the coating layer including an inorganic compound, a polymer and an organic/inorganic bonding silane compound having a first reactive functional group; and an electrode contacting the coating layer, and including an active material and a binder having a second reactive functional group, wherein the first reactive functional group has reactivity with the second reactive functional group, and the lithium secondary battery includes a chemical bond generated by reacting the first reactive functional group with the second reactive functional group.

The inorganic compound may be surface-coated with the organic/inorganic bonding silane compound having the first reactive functional group.

The first reactive functional group may be selected from the group consisting of an amino group, an isocyanate group, an epoxy group, a mercapto group, a vinyl group, a halogenated group and a thiol group, and a combination thereof.

The organic/inorganic bonding silane compound having a first reactive functional group may be selected from the group consisting of an epoxyalkylalkoxysilane, an aminoalkylalkoxysilane, an isocyanato alkylalkoxysilane, a mercapto alkylalkoxysilane, and a combination thereof; or the organic/inorganic bonding silane compound having the first reactive functional group may be selected from the group consisting of a vinylalkylalkoxysilane, a halogenated alkylalkoxysilane, a vinylhalosilane, an alkylalkoxysilane, and a combination thereof, the first reactive functional group being selected from the group consisting of an amino group, an isocyanate group, an epoxy group, a mercapto group, a vinyl group, a halogenated group and a thiol group, and a combination thereof.

The inorganic compound may be selected from the group consisting of $SrTiO_3$, $SnO_2$, $CeO_2$, $MgO$, $NiO$, $CaO$, $ZnO$, $ZrO_2$, $Y_2O_3$, $Al_2O_3$, $TiO_2$, $BaTiO_3$, $SiO_2$, and combinations thereof.

The coating layer of the separator may further include a polymer selected from the group consisting of polyvinylidenefluoride (PVdF), poly(vinylidene-hexafluoropropylene) (P(VdF-HFP)), polyethyleneoxide (PEO), polyacrylonitrile (PAN), polyimide (PI), polyamic acid (PAA), polyamideimide (PAI), aramid, polyvinylacetate (PVA), polymethylmethacrylate (PMMA), polyvinylether (PVE), and combinations thereof.

The separator may include a porous substrate selected from the group consisting of glass fiber, polyester, TEFLON (tetrafluoroethylene), polyolefin, polytetrafluoroethylene (PTFE), and combinations thereof.

The coating layer of the separator may be formed on one side or both sides of the porous substrate.

The second reactive functional group may be selected from the group consisting of an —OH group, a —CHO group, a —COOH group, a —COX group, a —COO— group, a —NH$_2$ group, a group derived from maleic acid, a group derived from maleic anhydride, and a combination thereof, X being a halogen.

The chemical bond may be included in a functional group selected from the group consisting of —CONH—, —COO—, —N(H)COOC(O)—, —CH(OH)CH$_2$OC(O)—, —C(NH—R)OO—, —C(OH)N(H)—, —C(OH)C(O)—, —OC(O)N(H)—, —N(H)C(O)N(H)—, —SC(O)—, and a combination thereof, R being an organic group.

The binder having a second reactive functional group may be selected from the group consisting of polyvinylalcohol, carboxymethylcellulose, hydroxypropylcellulose, a carboxylated polyvinylchloride, polyurethane, diacetylcellulose, an acrylated styrene-butadiene rubber, and combinations thereof; or the binder having the second reactive functional group may be selected from the group consisting of polyvinylchloride, polyvinylfluoride, an ethylene oxide-containing polymer, polyvinylpyrrolidone, polytetrafluoroethylene, polyvinylidene fluoride, polyethylene, polypropylene, a styrene-butadiene rubber, an epoxy resin, nylon, and combinations thereof.

The active material layer may further include another binder, the other binder being selected from the group consisting of diacetylcellulose, polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and combinations thereof.

The electrode may be a positive electrode or a negative electrode.

The coating layer of the separator may include about 1 part by weight to about 20 parts by weight of the organic/inorganic bonding silane compound having the first reactive functional group based on 100 parts by weight of the inorganic compound, before the chemical bond is generated by reacting the first reactive functional group with the second reactive functional group.

The coating layer of the separator may include the inorganic compound and the polymer in a weight ratio in a range of about 1:0.2 to about 1:5.

Adhesion strength between the coating layer and the electrode may be in a range of about 0.015 N/m to about 0.2 N/m.

The lithium secondary battery may further include an electrolyte including a non-aqueous organic solvent and a lithium salt.

In another embodiment, a lithium secondary battery includes: a separator including a coating layer including an inorganic compound and a bonding organofunctional silane compound; an electrode contacting the coating layer, and including an active material and a binder, the bonding organofunctional silane compound and the binder of the electrode being chemically bonded to one another.

The bonding organofunctional silane compound and the binder of the electrode may be chemically bonded to one another through a bridging group, the bridging group being the reaction product of a first reactive functional group of the bonding organofunctional silane compound and a second reactive functional group of the binder.

The bridging group may be selected from the group consisting of —CONH—, —COO—, —N(H)COOC(O)—, —CH(OH)CH$_2$OC(O)—, —C(NH—R)OO—, —C(OH)N(H)—, —C(OH)C(O)—, —OC(O)N(H)—, —N(H)C(O)N(H)—, —SC(O)—, and a combination thereof, R being an organic group.

The lithium secondary battery may have excellent cycle-life characteristic, strength, and high temperature stability.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1:
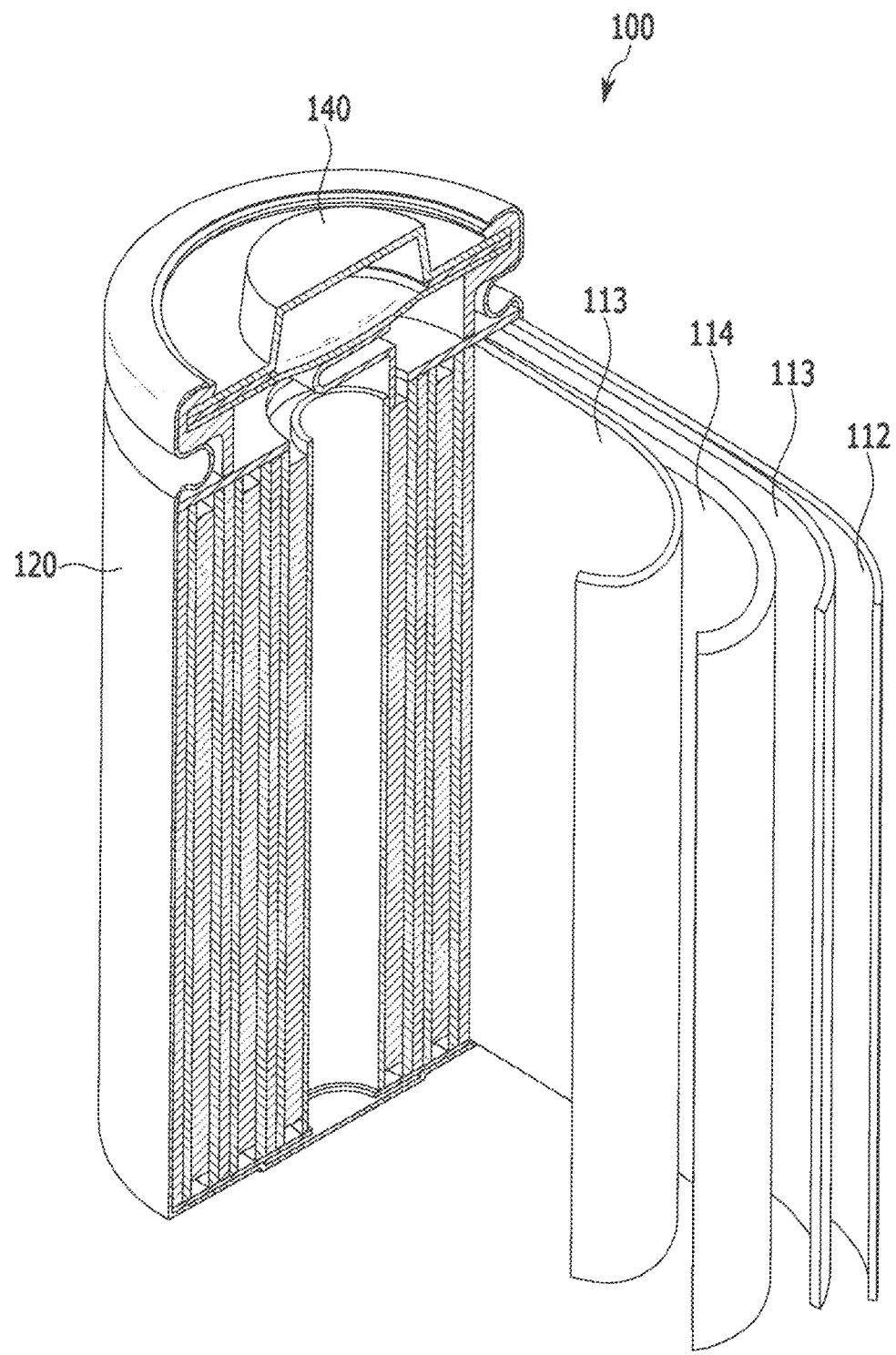
FIG. 1 is a schematic view showing a lithium secondary battery according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

According to one embodiment of the present invention, a lithium secondary battery includes a separator including a coating layer, the coating layer including an inorganic compound, a polymer and an organic/inorganic bonding silane compound having a first reactive functional group; and an electrode contacting the coating layer and including an active material and a binder having a second reactive functional group, wherein the first reactive functional group has reactivity with the second reactive functional group, and the lithium secondary battery includes a chemical bond generated by reacting the first reactive functional group with the second reactive functional group.

The chemical bond generated by the reaction of the first and second reactive functional groups increases adherence between the separator and the electrode in the lithium secondary battery. The increased adherence between separator and electrode may improve cycle-life characteristic, strength, high temperature stability, and the like.

In one embodiment, the coating layer of the separator may include an inorganic compound surface-coated with the organic/inorganic bonding silane compound having the first reactive functional group (e.g., an organofunctional silane having the first reactive functional group). In one embodiment, the organic/inorganic bonding silane compound and the inorganic compound form a chemical bond. For example, the inorganic compound may be surface-treated with the organic/inorganic bonding silane compound. In this way, the surface of the inorganic compound is coated with the organic/inorganic bonding silane compound and, thus, may have a surface-coating of the organic/inorganic bonding silane compound thereon. The coating layer on the surface of the inorganic compound may be continuous or discontinuous.

The first reactive functional group included in the organic/inorganic bonding silane compound has reactivity with the second reactive functional group of the binder included in the electrode so that the first reactive functional group reacts with the second reactive functional group to form a chemical bond as aforementioned. Owing to the chemical bond, the coating layer of the separator may be connected to the binder of the electrode via the organic/inorganic bonding silane compound, thereby, improving adherence between the separator and the electrode.

In one embodiment, a lithium secondary battery includes: a separator including a coating layer including a bonding organofunctional silane compound and an inorganic compound; an electrode contacting the coating layer, and including an active material and a binder, the bonding organofunctional silane compound and the binder of the electrode being chemically bonded to one another. The organofunctional silane compound and the binder of the electrode may be chemically bonded to one another through a bridging group, the bridging group being the reaction product of a first reactive functional group of the organofunctional silane compound and a second reactive functional group of the binder.

The inorganic compound may include at least one selected from the group consisting of $SrTiO_3$, $SnO_2$, $CeO_2$, MgO, NiO, CaO, ZnO, $ZrO_2$, $Y_2O_3$, $Al_2O_3$, $TiO_2$, $BaTiO_3$, $SiO_2$, and combinations thereof, but it is not limited thereto.

The first reactive functional group may include at least one selected from the group consisting of an amino group, an isocyanate group, an epoxy group, a mercapto group, a vinyl group, a halogenated group, a thiol group, and a combination thereof, but it is not limited thereto.

The organic/inorganic bonding silane compound having a first reactive functional group may be selected from the group consisting of, for example, epoxyalkylalkoxysilane, such as 3-glycidoxypropyltrimethoxysilane, 3-glycidoxypropyltriethoxysilane, 2-(3,4-epoxycyclohexyl)ethyltrimethoxysilane, 3-glycidoxypropylmethyldiethoxysilane, and the like; aminoalkylalkoxysilane, such as 3-aminopropyltriethoxysilane, (3-trimethoxysilylpropyl)diethylenetriamine, (2-aminoethyl)-3-aminopropyltrimethoxysilane, N-methylaminopropyltrimethoxysilane, and the like; isocyanato alkylalkoxysilane, such as 3-(triethoxysilyl)propyl isocyanate 3-(trimethoxysilyl)propyl isocyanate, and the like; mercapto alkylalkoxysilane, such as 3-mercaptopropyltrimethoxysilane, bis(3-(triethoxysilyl)propyl)-tetrasulfide, and the like; and a combination thereof, but it is not limited thereto.

The organic/inorganic bonding silane compound having a first reactive functional group may be also an organic/inorganic bonding silane compound selected from the group consisting of vinylalkylalkoxysilane, such as vinyltris(2-methoxy ethoxy)silane, 3-methacryloxylpropyltrimethoxysilane, and the like; halogenated alkylalkoxysilane, such as 3-chloropropyltrimethoxysilane, and the like; vinylhalosilane, such as vinyltrichlorosilane, and the like; alkylalkoxysilane, such as methyltriacetoxysilane, and the like that have the first reactive functional group selected from the group consisting of an amino group, an isocyanate group, an epoxy group, a mercapto group, a vinyl group, a halogenated group, a thiol group, and a combination thereof.

In one embodiment, the inorganic compound has a particle shape and is surface-treated with the organic/inorganic bonding silane compound. When the inorganic compound is mixed with a polymer, it may form a coating layer on the separator. The coating layer may be formed using a general method of, for example, mixing the inorganic compound, the organic/inorganic bonding silane compound, and the polymer to prepare a resin composition solution and coating the resin composition solution on at least one side of a separator. The inorganic compound particles may have, for example, an average particle diameter in a range of about 0.05 µm to about 2 µm.

The polymer may be one selected from the group consisting of polyvinylidenefluoride (PVdF), poly(vinylidene-hexafluoropropylene) (P(VdF-HFP)), polyethyleneoxide (PEO), polyacrylonitrile (PAN), polyimide (PI), polyamic acid (PAA), polyamideimide (PAI), aramid, polyvinylacetate (PVA), polymethylmethacrylate (PMMA), polyvinylether (PVE), and combinations thereof.

The coating layer of the separator may include the inorganic compound and the polymer in a weight ratio (inorganic compound:polymer) in a range of about 1:0.2 to about 1:5. When the coating layer of the separator includes an inorganic compound and the polymer within the above ratio range, it may increase heat resistance of the separator due to the inorganic compound and be more uniform, thereby improving battery safety.

In addition, the coating layer of the separator may include about 1 to about 20 parts by weight of the organic/inorganic bonding silane compound having the first reactive functional group based on 100 parts by weight of the inorganic compound before a chemical bond is generated by reacting the first reactive functional group with the second functional group. When the coating layer of the separator includes the organic/inorganic bonding silane compound having the first reactive functional group within the above ratio range, it may increase adherence between the electrode and the separator due to the resultant chemical bond and also decrease a side reaction of non-reacted reactants, which would otherwise result from the excessive addition of the silane compound. In embodiment, after the reaction, the coating layer of the separator may include about 0.8 to about 18 parts by weight of the organic/inorganic bonding silane compound having the first reactive functional group based on 100 parts by weight of the coating layer.

The coating layer of the separator may further include the binder having the second reactive functional group. The second reactive functional group may be selected from the group consisting of an —OH group, a —CHO group, a —COOH group, a —COX group, a —COO— group, a —$NH_2$ group, a group derived from maleic acid, a group derived from maleic anhydride, and a combination thereof, X being a halogen.

The binder having a second reactive functional group may be selected from the group consisting of polyvinylalcohol, carboxymethylcellulose, hydroxypropylcellulose, a carboxylated polyvinylchloride, polyurethane, diacetylcellulose, an acrylated styrene-butadiene rubber, and combinations thereof; or the binder having the second reactive functional group may be selected from the group consisting of polyvinylchloride, polyvinylfluoride, an ethylene oxide-containing polymer, polyvinylpyrrolidone, polytetrafluoroethylene, polyvinylidene fluoride, polyethylene, polypropylene, a styrene-butadiene rubber, an epoxy resin, nylon, and combinations thereof.

When the coating layer includes the binder having the second reactive functional group, the amount of the binder having the second reactive functional group may be about 10 parts by weight to about 35 parts by weight based on 100 parts by total weight of the coating layer.

The thickness of the coating layer contributes to the thickness of a separator and, thus, may be adjusted depending on the desired thickness of the separator. A thinner separator may decrease cell resistance and increase capacity, but deteriorate safety. Accordingly, the coating layer may have a thickness appropriately adjusted depending on a desired purpose, for example, a thickness in a range of about 0.5 µm to about 5 µm.

The separator may have a thickness determined depending on desired capacity of a battery. For example, the separator may have a thickness in a range of about 10 µm to about 30 µm.

The separator may include a porous substrate selected from the group consisting of glass fiber, polyester, TEFLON (tetrafluoroethylene), polyolefin, polytetrafluoroethylene (PTFE), and combinations thereof. For example, the substrate may include polyolefin, such as polyethylene, polypropylene, and the like and may be formed of more than two layers, for example, a multilayer, such as a polyethylene/polypropylene separator, a polyethylene/polypropylene/polyethylene separator, a polypropylene/polyethylene/polypropylene separator, and the like. The separator may provide excellent heat resistance, even when a single layer, rather than a relatively thick multilayered substrate, which may reduce battery capacity, is used.

The coating layer of the separator may be on one side or both sides of the porous substrate. For example, when the coating layer of the separator is on one side of the porous substrate, the coating layer may contact a positive electrode or a negative electrode. When the coating layer is on one side of the porous substrate and contacts a positive electrode, a second reactive functional group included in the positive active material of the positive electrode may form a chemical bond with the first reactive functional group included in the coating layer. When the coating layer is on one side of the porous substrate and contacts a negative electrode, a second reactive functional group included in the negative active material of the negative electrode may form a chemical bond with the first reactive functional group included in the coating layer. When the coating layer is on both sides of the porous substrate and contacts positive and negative electrodes, a second reactive functional group included in the positive active material of the positive electrode and another second reactive functional group included in the negative active material of the negative electrode may form a chemical bond with the first reactive functional group included in the coating layer contacting the respective electrodes.

The second reactive functional group may be selected from the group consisting of an —OH group, a —CHO group, a —COOH group, a —COX group (wherein X is a halogen), a —COO— group, a —$NH_2$ group, a group derived from maleic acid, a group derived from maleic anhydride, and a combination thereof.

As described above, the first reactive functional group has reactivity with the second reactive functional group and forms a chemical bond, for example, a chemical bond included in a bridging group selected from the group consisting of —CONH—, —COO—, —N(H)COOC(O)—, —CH(OH)$CH_2$OC(O)—, —C(NH—R)OO— (wherein, R is an organic group), —C(OH)N(H)—, —C(OH)C(O)—, —OC(O)N(H)—, —N(H)C(O)N(H)—, —SC(O)—, and combinations thereof, but the present invention is not limited thereto.

The electrode may include a binder having a second reactive functional group, which is prepared by adding a functional group having reactivity with a first reactive functional group to a well-known binder. For example, the binder having a second reactive functional group may be selected from the group consisting of polyvinylalcohol, carboxymethylcellulose, hydroxypropylcellulose, carboxylated polyvinylchloride, polyurethane, diacetylcellulose, acrylated styrene-butadiene rubber, and the like, or may be a binder selected from the group consisting of polyvinylchloride, polyvinylfluoride, ethylene oxide-containing polymer, polyvinylpyrrolidone, polytetrafluoroethylene, polyvinylidene fluoride, poly(vinylidene-hexafluoropropylene), polyethylene, polypropylene, styrene-butadiene rubber, an epoxy resin, nylon, and combinations thereof by introducing the second reactive functional group.

The electrode may further include another binder selected from the group consisting of diacetylcellulose, polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, an acrylated styrene-butadiene rubber, an epoxy resin, nylon, and combinations thereof, in addition to the binder having a second reactive functional group.

The electrode may be a positive electrode or a negative electrode.

Adhesion strength between the coating layer of the separator and the electrode may be improved due to the chemical bond between the first and second reactive functional groups. In one embodiment, adhesion strength between the coating layer and electrode may be in a range of about 0.015 N/m to about 0.2 N/m, specifically about 0.015 N/m to about 0.1 N/m.

The lithium secondary battery is fabricated by interposing a separator having the coating layer between positive and negative electrodes and injecting an electrolyte therein and then, heat-treating them to react the first and second reactive functional groups and to form a chemical bond between the first and second reactive functional groups. The heat treatment may be, for example, performed through heat press. Through such a heat press during the heat treatment, adhesion strength between the coating layer and electrode may be further improved.

The heat treatment may be performed at a temperature in a range of about 80° C. to about 110° C. for a time period in a range of about 30 seconds to about 150 seconds using a pressure in a range of about 100 Kgf/$cm^2$ to about 300 Kgf/$cm^2$.

The lithium secondary battery may be classified into lithium ion batteries, lithium ion polymer batteries, and lithium polymer batteries according to the presence of a separator and the kind of electrolyte used in the battery. The lithium secondary batteries may have a variety of shapes and sizes and thus, include cylindrical, prismatic, or coin-type batteries and, also, may be thin film batteries or rather bulky batteries in size. Structures and fabrication methods for lithium secondary batteries are well known in the art.

FIG. 1 is an exploded perspective view showing a lithium secondary battery in accordance with an embodiment. Referring to FIG. 1, the lithium secondary battery 100 is a cylindrical battery that includes a negative electrode 112, a positive electrode 114, a separator 113 disposed between the positive electrode 114 and the negative electrode 112, an electrolyte (not shown) impregnated in the negative electrode 112, the positive electrode 114, and the separator 113, a battery case 120, and a sealing member 140 sealing the battery case 120. The lithium secondary battery 100 is fabricated by sequentially stacking the negative electrode 112, the positive electrode 114, and the separator 113, and spiral-winding them and housing the wound product in the battery case 120.

In one embodiment, the negative electrode and the positive electrode include a current collector and an negative active material layer on the current collector, and the negative active material layer includes a negative active material and a binder, respectively. At least one of the binders included in the negative and the positive electrodes is a binder having the second reactive functional group as described above.

The negative active material includes a material that reversibly intercalates/deintercalates lithium ions, a lithium metal, a lithium metal alloy, a material being capable of doping lithium, or a transition metal oxide.

The material that reversibly intercalates/deintercalates lithium ions includes, for example, carbon materials. The carbon material may be any generally-used carbon-based negative active material in a lithium ion secondary battery. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, mesophase pitch carbonized product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ (0<x<2), a Si—C composite, a Si-Q alloy (wherein Q is an element selected from the group consisting of an alkali metal, an alkaline-earth metal, Group 13 to 16 elements, a transition element, a rare earth element, and a combination thereof, and not Si), Sn, $SnO_2$, a Sn—C composite, a Sn—R alloy (wherein R is an element selected from the group consisting of an alkali metal, an alkaline-earth metal, Group 13 to 16 elements, a transition element, a rare earth element, and combinations thereof and is not Sn), and the like. For example, the Q and R may each be an element of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, and the like.

The binder in the negative active material layer may be the binder having a second reactive functional group; a general binder that improves binding properties of the negative active material particles to each other and to a current collector, or a mixture thereof. When the binder having a second reactive functional group and the general binder are used, the weight ratio of the binder having a second reactive functional group and the general binder may be 5:5 to 9:1. The general binder may include a non-water-soluble binder, a water-soluble binder, or a combination thereof. The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber, polyvinylalcohol, sodium polyacrylate, a copolymer of propylene and C2 to C8 olefin, a copolymer of (meth)acrylic acid and (meth)acrylic acid alkylester, or a combination thereof.

When the water-soluble binder is used as a negative electrode binder, a cellulose-based compound may be further used to improve viscosity. The cellulose-based compound includes one or more of carboxylmethyl cellulose, hydroxypropyl cellulose, hydroxypropylmethyl cellulose, diacetyl cellulose, methyl cellulose, or alkaline metal salts thereof. The alkaline metal may be Na, K, or Li.

The cellulose-based compound may be included in an amount of about 0.1 to about 3 parts by weight based on 100 parts by weight of the negative active material.

The negative active material layer may optionally include a conductive material. The conductive material improves electrical conductivity of a negative electrode. Any electrically conductive material can be used as a conductive agent unless it causes a chemical change. Examples of the conductive material include a carbon-based material, such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer, such as a polyphenylene derivative; or a mixture thereof.

The current collector may be a copper foil, a nickel foil, a stainless steel foil, a titanium foil, a nickel foam, a copper foam, a polymer substrate coated with a conductive metal, or a combination thereof.

The positive electrode includes a current collector and a positive active material layer on the current collector. The positive active material layer includes a positive active material and a binder. The binder is the binder having the aforementioned second reactive functional group.

The positive active material includes lithiated intercalation compounds that reversibly intercalate and deintercalate lithium ions. The positive active material may include a composite oxide including at least one selected from the group consisting of cobalt, manganese, and nickel, as well as lithium. In particular, the following compounds may be used:

$Li_aA_{1-b}R_bD_2$ (0.90≤a≤1.8 and 0≤b≤0.5); $Li_aE_{1-b}R_bO_{2-c}D_b$ (0.90≤a≤1.8, 0≤b≤0.5 and 0≤c≤0.05); $LiE_{2-b}R_bO_{4-c}D_c$ (0≤b≤0.5, 0≤c≤0.05); $Li_aNi_{1-b-c}Co_bR_bD_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cD_\alpha$ (0.90≤a≤1.8, 0≤b≤0.5, 0≤c≤0.05 and 0<α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2); $Li_aNi_bE_cG_dO_2$ (0.90≤a≤1.8, 0≤b≤0.9, 0≤c≤0.5 and 0.001≤d≤0.1); $Li_aNi_bCo_cMn_dGeO_2$ (0.90≤a≤1.8, 0≤b≤0.9, 0≤c≤0.5, 0≤d≤0.5 and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The above-described compounds can have a coating layer on the surface, or can be mixed with a compound having a coating layer. The coating layer may include at least one coating element compound selected from the group consisting of an oxide of a coating element, a hydroxide of the coating element, an oxyhydroxide of the coating element, an oxycarbonate of the coating element, and a hydroxyl carbonate of the coating element. The compounds for a coating layer can be amorphous or crystalline. The coating element for a coating layer may include Mg, Al, Co, K, Na, Ca, Si, Ti, V, Sn, Ge, Ga, B, As, Zr, or a mixture thereof. The coating layer can be formed in a method having no negative influence on the properties of the positive active material by including these elements in the compound. For example, the method may include any suitable coating method, such as spray coating, dipping, and the like, but it is not illustrated in more detail, since it is well-known to those who work in the related field.

The positive active material layer may include a binder that improves binding properties of the positive active material particles to each other and to a current collector, and may further include a binder along with the binder having a second reactive functional group. The binder that may be additionally added may be polyvinylalcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, an acrylated styrene-butadiene rubber, an epoxy resin, nylon, and the like, but it is not limited thereto.

The positive active material layer may optionally include a conductive material. The conductive material improves electrical conductivity of a negative electrode. Any electrically conductive material can be used as a conductive agent unless it causes a chemical change. For example, it may include natural graphite, artificial graphite, carbon black, acetylene black, ketjen black, carbon fiber, metal powder, metal fiber or the like, such as copper, nickel, aluminum, silver or the like, or one or at least one kind mixture of conductive material, such as polyphenylene derivative or the like.

The current collector may be Al, but it is not limited thereto.

The negative and positive electrodes may be fabricated by a method including mixing the active material, a conductive material, and a binder into an active material composition, and coating the composition on a current collector, respectively. The electrode-manufacturing method is well known, and thus it is not described in detail in the present specification. The solvent may include N-methylpyrrolidone and the like but it is not limited thereto. Furthermore, if the aqueous binder is used in the negative electrode, water may be used as the solvent.

The electrolyte includes a non-aqueous organic solvent and a lithium salt.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like. Examples of the ester-based solvent may include methyl acetate, ethyl acetate, n-propyl acetate, 1,1-dimethylethyl acetate, methylpropionate, ethylpropionate, ɣ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone, or the like. Examples of the alcohol-based solvent include ethyl alcohol, isopropyl alcohol, and the like, and examples of the aprotic solvent include nitriles, such as R—CN (wherein R is a C2 to C20 linear, branched, or cyclic hydrocarbon group including a double bond, an aromatic ring, or an ether bond), amides, such as dimethylformamide, dioxolanes, such as 1,3-dioxolane, sulfolanes, or the like.

The non-aqueous organic solvent may be used singularly or in a mixture. When the organic solvent is used in a mixture, the mixture ratio may be controlled in accordance with a desirable battery performance, which may be understood by the person skilled in the related art.

In an embodiment, the carbonate-based solvent is prepared by mixing a cyclic carbonate and a linear carbonate. The cyclic carbonate and the linear carbonate are mixed together in the volume ratio of about 1:1 to about 1:9. Within this range, performance of the electrolyte may be improved.

The non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio in a range of about 1:1 to about 30:1.

The aromatic hydrocarbon-based organic solvent may be represented by the following Chemical Formula 1.

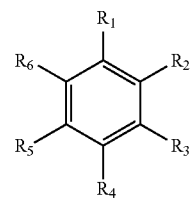

Chemical Formula 1

In Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate, an ethylene carbonate-based compound represented by the following Chemical Formula 2, or a combination thereof to improve cycle-life characteristics.

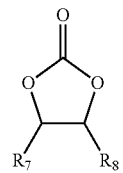

Chemical Formula 2

In Chemical Formula 2, R7 and R8 are independently selected from hydrogen, a halogen, a cyano group (CN), a nitro group ($NO_2$), and a C1 to C5 fluoroalkyl group, provided that at least one of R7 and R8 is selected from a halogen, a cyano group (CN), a nitro group ($NO_2$), and a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt, which is dissolved in an organic solvent, supplies a battery with lithium ions, operates a basic operation of the lithium secondary battery, and improves lithium ion transportation between positive and negative electrodes therein. Examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bis(oxalato) borate, LiBOB), or a combination thereof, as a supporting electrolytic salt. The lithium salt may be used in a concentration in a range of about 0.1 M to about 2.0 M. When the lithium salt is included at the above concentration range, an electrolyte may have excellent performance and lithium ion mobility due to optimal electrolyte conductivity and viscosity.

The separator 113 separates the negative electrode 112 from the positive electrode 114 and provides passages for lithium ions.

The following examples illustrate the present invention in more detail. These examples, however, should not be interpreted as limiting the scope of the present invention.

EXAMPLE

Examples 1 to 3

Positive Electrode $LiCoO_2$ as a positive active material, a binder, and Super-P as a conductive material in a weight ratio of 94/3/3 were mixed in NMP (N-methyl-2-pyrrolidone) as a solvent to prepare a slurry, and the slurry was coated on a 12 μm-thick aluminum current collector. The coated product was dried and compressed, fabricating a positive electrode.

The binder was prepared by mixing a binder including a PVdF-HFP copolymer (the contents of the grafted HFP about 12 wt %) binder and a PVdF-based binder including a COOH component (e.g., COOH functional group, polyvinyldene fluoride grafted COOH)) at mixing ratio of 7:3 weight ratio.

Negative Electrode

Graphite as a negative active material, a styrene-butadiene rubber (SBR) as a binder, and CMC (carboxymethyl cellulose) in a weight ratio of 98/1/1 were mixed in water as a solvent to prepare a slurry, and the slurry was coated on a 12 μm-thick copper current collector.

Similarly to the positive electrode, the coated product was dried and compressed, fabricating a negative electrode.

Separator Including Coating Layer 25 g of alumina was added to 75 g of acetone. The mixture was agitated. Then, 2.5 g of an additive (organic/inorganic bonding silane compound including the first reactive functional group) provided in the following Table 1 (3-aminopropyltriethoxysilane in Example 1,3-glycidoxypropyltriethoxysilane Example 2, and 3-(triethoxysilyl)propyl isocyanate in Example 3) was added to the resulting mixture of acetone and alumina, and the obtained mixture was agitated (solution 1). The additive reacted with alumina during the agitation and coated the surface of the alumina.

Additionally, a polymer solution was prepared by adding 5 g of a poly(vinylidene-hexafluoropropylene) (PVdF-HFP) copolymer and poly(vinylidene-hexafluoropropylene) including COOH to 45 g of acetone and agitating them (solution 2). At this time, the amount of poly(vinlyidene-hexafluoropropylene) including COOH was about 25 wt % based on 100 wt % of the total weight of alumina, poly (vinylidene-hexafluoropropylene) copolymer, and poly(vinlyidene-hexafluoropropylene) including COOH.

The solutions 1 and 2 were mixed and agitated (solution 3).

The solution 3 was coated on both sides of a 9 μm-thick polyethylene (PE) separator. The coating layers were respectively 2 μm thick.

Fabrication of Electrode

The positive electrode, negative electrode, and separator were used to fabricate a pouch-type battery cell 423380. Herein, an electrolyte was prepared by mixing EC (ethyl carbonate)/EMC (ethylmethyl carbonate)/DEC (diethyl carbonate) in a volume ratio of 3/5/2 and dissolving 1.3M $LiPF_6$ therein.

The electrolyte was injected into the cell, and the cell was pressed with 200 Kgf of force at 100° C. for 100 seconds.

Comparative Example 1

A pouch-type cell 423380 was fabricated according to the same method as Examples 1 to 3 except for using only a PVdF binder, and not the PVdF-based binder of Examples 1-3, to fabricate a positive electrode and using a solution 1 including no additive (e.g., it did not include the additive of solution 1, as described with respect to Examples 1-3) to prepare a coating layer for a separator.

Comparative Example 2

A pouch-type cell 423380 was fabricated according to the same method as Examples 1 to 3 except for using a solution 1 including no additive (e.g., it did not include the additive of solution 1, as described with respect to Examples 1-3) to prepare a coating layer for a separator.

Comparative Examples 3 to 4

A pouch-type cell 423380 was fabricated according to the same method as Examples 1 to 3 except for using a PVdF binder, instead of the PVdF-based binder according to Examples 1 to 3 and Comparative Example 2, to fabricate a positive electrode and using 3-methacryloxypropyltrimethoxysilane with methacrylate as an end group, as an additive to prepare a coating layer for a separator.

Experimental Example 1

The cells according to Examples 1 to 3 and Comparative Examples 1 to 4 were charged once at 0.2C and discharged at 0.2C (formation process) and charged once at 0.5C and discharged at 0.2C (standard process). Herein, standard capacity refers to discharge capacity in the standard process. The processes were performed at a charge potential of 4.35V and a discharge potential of 3.0V.

Experimental Example 2

The cells according to Examples 1 to 3 and Comparative Examples 1 to 4 were charged under a charge condition (CC-CV charge: the cell was constant-current charged at 0.7C to 4.35V, and then constant-voltage charged to, 0.025C (40 mA) Cut-off) and put in a 150° C. oven for 3600 seconds and then, checked for indications of combustion or non combustion to evaluate stability. The results are provided in the following Table 1, in which batteries that showed indications of combustion are identified by "fire" and batteries that did not show indications of combustion are identified by "no fire."

ysilane was added to the resulting mixture with acetone and alumina, and the obtained mixture was agitated (solution 1). The additive reacted with alumina during the agitation and coated the surface thereof.

Next, a polymer solution (solution 2) was prepared by adding 5 g of a poly(vinylidene-hexafluoropropylene) (PVdF-HFP) copolymer including a COOH component (e.g., COOH functional group), which was used as a positive

TABLE 1

|  | Binder in positive active material layer | Additive in separator | Use amount of additive (based on 100 parts by weight of alumina) | Binder in negative active material layer | Standard capacity (mAh) | Stability evaluation after 150° C. thermal exposure |
|---|---|---|---|---|---|---|
| Example 1 | PVdF-HFP (without a COOH group) + PVdF (with a COOH group) | 3-aminopropyl triethoxysilane | 10 parts by weight | SBR + CMC | 1700 | No fire |
| Example 2 | PVdF-HFP (without a COOH group) + PVdF (with a COOH group) | 3-glycidoxypropyl triethoxysilane | 10 parts by weight | SBR + CMC | 1700 | No Fire |
| Example 3 | PVdF-HFP (without a COOH group) + PVdF (with a COOH group) | 3-(triethoxysilyl) propyl isocyanate | 10 parts by weight | SBR + CMC | 1700 | No fire |
| Comparative Example 1 | PVdF (without a COOH group) | — | — | SBR + CMC | 1700 | Fire |
| Comparative Example 2 | PVdF (with a COOH group) | — | — | SBR + CMC | 1700 | Fire |
| Comparative Example 3 | PVdF-HFP (without a COOH group) | 3-methacryloxy propyl trimethoxysilane | 10 parts by weight | SBR + CMC | 1700 | Fire |
| Comparative Example 4 | PVdF-HFP (without a COOH group) + PVdF (with a COOH group) | 3-methacryloxy propyl trimethoxysilane | 10 parts by weight | SBR + CMC | 1700 | Fire |

Experimental Example 3

The cells according to Example 3 and Comparative Example 2 were checked for adherence between separator and positive active material after disassembly of the respective cells.

Figure 2:
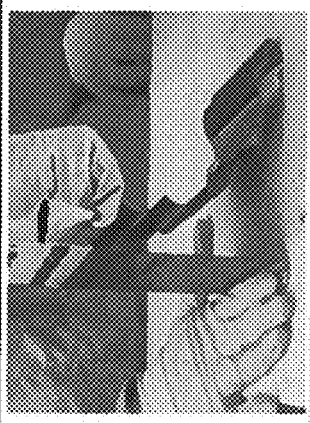
FIG. 2 is a table including photographs showing the separation of the positive active material layer and negative active material layer from a separator after the lithium secondary battery cells according to Example 3 and Comparative Example 2 are disassembled, and including photographs showing the positive active material layer and the negative active material layer according to Example 3 and Comparative Example 2 after the separation.

FIG. 2 provides photographs showing the disassembly process.

Referring to FIG. 2, the cell according to Comparative Example 2 was easily disassembled, while the cell according to Example 3 was not easily disassembled, as can be seen from the tension shown in the photographs. In addition, Example 3 showed that the coating layer component was transferred on the surface of the positive active material layer separated therefrom. Accordingly, Example 3 had larger adherence between separator and positive electrode than did Comparative Example 2.

Likewise, the negative electrode of Example 3 showed that a coating layer component included in a separator was transferred on the surface of the negative active material layer. Accordingly, the result shows that Example 3 had greater adherence between separator and negative electrode than did Comparative Example 2.

Experimental Example 4

25 g of alumina was added to 75 g of acetone, and the mixture was agitated. Then, 3.0 g of 3-aminopropyltriethoxactive material binder used in Examples 1 to 3, to 45 g of acetone and agitating the mixture.

The solutions 1 and 2 were mixed and agitated (solution 3).

Figure 3:
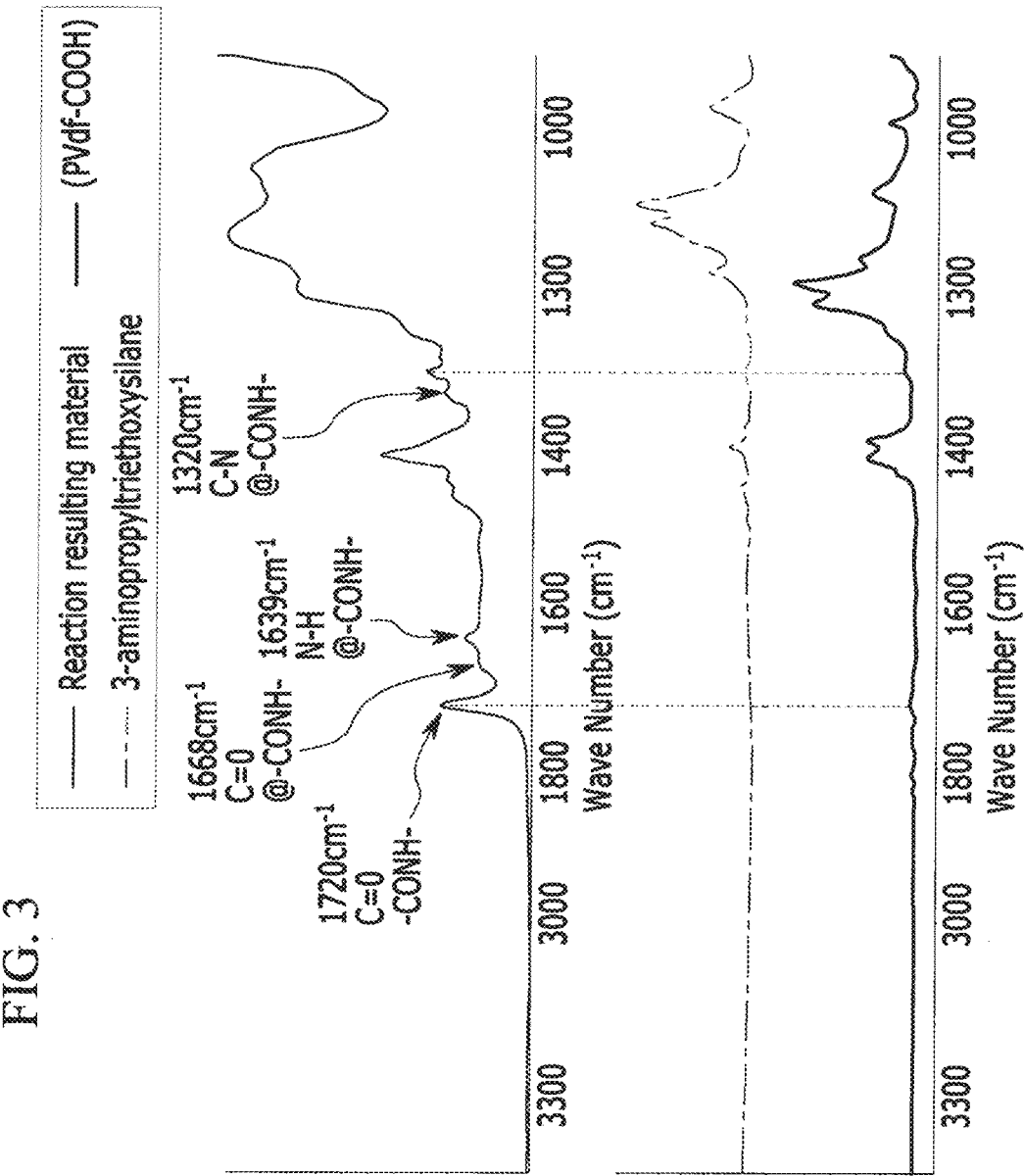
FIG. 3 is a graph of IR results of a reaction product after forming a chemical bond between the same additive and the binder used in Example 1 in order to show a chemical bond between the separator and the electrode of the lithium secondary battery cell according to Example 1.

The solution 3 was reacted at 100° C., and IR (Infrared spectroscopic) analysis was performed on the resultant reaction product. FIG. 3 shows IR analysis results of the reaction product.

The IR analysis results in FIG. 3 showed peaks (1720 cm$^{-1}$, 1668 cm$^{-1}$, 1639 cm$^{-1}$, and 1320 cm$^{-1}$) corresponding to that of an amide group (CONH).

Based on the IR analysis results, the increased adherence between positive active material and separator is likely due to a chemical bond (—CONH—) between 3-aminopropyl-triethoxysilane and a COOH functional group of the positive active material binder.

Example 4

25 g of alumina, 0.5 g of 3-aminopropyltriethoxysilane additive were added to 75 g of acetone (solution 1). The additive reacted with alumina during the agitation and coated the surface of the alumina.

Additionally, a polymer solution was prepared by adding 5 g of a poly(vinylidene-hexafluoropropylene) (PVdF-HFP) copolymer and poly(vinylidene-hexafluoropropylene) including COOH to 45 g of acetone and agitating them (solution 2). At this time, the amount of poly(vinylidene-hexafluoropropylene) including COOH was about 25 wt % based on 100 wt % of the total weight of alumina, poly (vinylidene-hexafluoropropylene) copolymer, and poly(vinylidene-hexafluoropropylene) including COOH.

The solutions 1 and 2 were mixed and agitated (solution 3). The solution 3 was coated on both sides of a 9 μm-thick polyethylene (PE) separator. The coating layers were respectively 2 μm thick.

Using the resulting separator with the coating layer and the positive and the negative electrode according to Example 1, a pouch-type battery cell 422380 was fabricated.

Example 5

A pouch-type battery cell 422380 was fabricated according to the same method as Example 1 except for using 1 g of 3-aminopropyltriethoxysilane.

Example 6

A pouch-type battery cell 422380 was fabricated according to the same method as Example 1 except for using 2 g of 3-aminopropyltriethoxysilane.

Example 7

A pouch-type battery cell 422380 was fabricated according to the same method as Example 1 except for using 3 g of 3-aminopropyltriethoxysilane.

Example 8

A pouch-type battery cell 422380 was fabricated according to the same method as Example 1 except for using 5 g of 3-aminopropyltriethoxysilane.

Comparative Example 5

A pouch-type battery cell 422380 was fabricated according to the same method as Example 1 except for not using 2 g of 3-aminopropyltriethoxysilane.

Experimental Example 3

Figure 4:
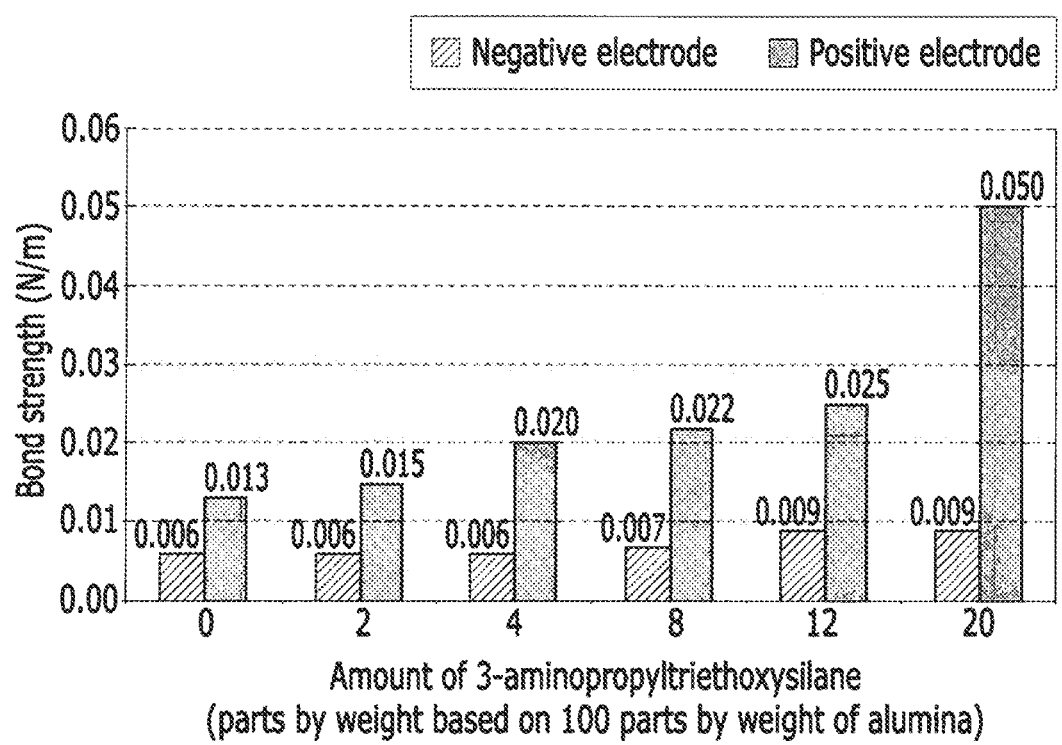
FIG. 4 is a graph showing the bond strength between the separator and the electrodes in the cells according to Examples 4 to 8 and Comparative Example 5.

The cells according to Examples 4 to 8 and Comparative Example 5 were disassembled and the bond strength between the separator and the positive electrode, and the adherence between the separator and the negative electrode were measured. The results are shown in FIG. 4. The bond strength was measured by the peel off test using a product of positive electrode/separator/negative electrode/positive electrode, and a tenstil strength tester from Instron under of a condition a width 20 mm and a speed of 50 mm/min. The peel off test was performed for five times, and the average of the results are shown in FIG. 4.

As shown in FIG. 4, the effect of the increases in the adherence using the organic/inorganic bonding silane compound is negligible between the separator and the negative electrode. However, the adherence between the separator and the negative electrode was incredibly increased in Examples 4 to 8, rather than Comparative Example 5.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A lithium secondary battery, comprising:
a separator comprising a coating layer, the coating layer comprising an inorganic compound, a polymer and an organic/inorganic bonding silane compound having a first reactive functional group; and
an electrode contacting the coating layer, and comprising an active material and a binder having a second reactive functional group,
wherein the first reactive functional group has reactivity with the second reactive functional group, and the lithium secondary battery comprises a chemical bond generated by reacting the first reactive functional group with the second reactive functional group,
wherein the chemical bond is included in a functional group selected from the group consisting of —CONH—, —COO—, —N(H)COOC(O)—, —CH(OH)CH$_2$OC(O)—, —C(NH—R)OO—, —C(OH)N(H)—, —C(OH)C(O)—, —OC(O)N(H)—, —N(H)C(O)N(H)—, —SC(O)—, and a combination thereof, wherein R is an organic group, and
wherein the inorganic compound is surface-treated with the organic/inorganic bonding silane having the first reactive functional group.
2. The lithium secondary battery of claim 1, wherein the first reactive functional group is selected from the group consisting of an amino group, an isocyanate group, an epoxy group, a mercapto group, a vinyl group, a halogenated group, a thiol group, and a combination thereof.
3. The lithium secondary battery of claim 1, wherein the organic/inorganic bonding silane compound having the first reactive functional group is selected from the group consisting of epoxyalkylalkoxysilane, aminoalkylalkoxysilane, isocyanato alkylalkoxysilane, mercapto alkylalkoxysilane, and a combination thereof; or
the organic/inorganic bonding silane compound having the first reactive functional group is selected from the group consisting of vinylalkylalkoxysilane, halogenated alkylalkoxysilane, vinylhalosilane, alkylalkoxysilane, and a combination thereof,
wherein the first reactive functional group is selected from the group consisting of an amino group, an isocyanate group, an epoxy group, a mercapto group, a vinyl group, a halogenated group, a thiol group, and a combination thereof.
4. The lithium secondary battery of claim 1, wherein the inorganic compound is selected from the group consisting of $SrTiO_3$, $SnO_2$, $CeO_2$, MgO, NiO, CaO, ZnO, $ZrO_2$, $Y_2O_3$, $Al_2O_3$, $TiO_2$, $BaTiO_3$, $SiO_2$, and combinations thereof.
5. The lithium secondary battery of claim 1, wherein the polymer is selected from the group consisting of polyvinylidenefluoride (PVdF), poly(vinylidene-hexafluoropropylene) (P(VdF-HFP)), polyethyleneoxide (PEO), polyacrylonitrile (PAN), polyimide (PI), polyamic acid (PAA), polyamideimide (PAI), aramid, polyvinylacetate (PVA), polymethylmethacrylate (PMMA), polyvinylether (PVE), and combinations thereof.
6. The lithium secondary battery of claim 1, wherein the separator further comprises a porous substrate selected from the group consisting of glass fiber, polyester, polyolefin, polytetrafluoroethylene (PTFE), and combinations thereof.
7. The lithium secondary battery of claim 6, wherein the coating layer of the separator is formed on one side or both sides of the porous substrate.

8. The lithium secondary battery of claim 1, wherein the second reactive functional group is selected from the group consisting of an —OH group, a —CHO group, a —COOH group, a —COX group, a —COO— group, a —NH$_2$ group, a group derived from maleic acid, a group derived from maleic anhydride, and a combination thereof, wherein X is a halogen.

9. The lithium secondary battery of claim 1, wherein the binder having the second reactive functional group is selected from the group consisting of polyvinylalcohol, carboxymethylcellulose, hydroxypropylcellulose, carboxylated polyvinylchloride, polyurethane, diacetylcellulose, an acrylated styrene-butadiene rubber, and combinations thereof; or the binder having the second reactive functional group is selected from the group consisting of polyvinylchloride, polyvinylfluoride, an ethylene oxide-containing polymer, polyvinylpyrrolidone, polytetrafluoroethylene, polyvinylidene fluoride, polyethylene, polypropylene, a styrene-butadiene rubber, an epoxy resin, nylon, and combinations thereof.

10. The lithium secondary battery of claim 1, wherein the electrode further comprises another binder selected from the group consisting of diacetylcellulose, polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, an acrylated styrene-butadiene rubber, an epoxy resin, nylon, and combinations thereof.

11. The lithium secondary battery of claim 1, wherein the electrode is a positive electrode or a negative electrode.

12. The lithium secondary battery of claim 1, wherein the coating layer of the separator comprises about 1 part by weight to about 20 parts by weight of the organic/inorganic bonding silane compound having the first reactive functional group, based on 100 parts by weight of the inorganic compound, before the chemical bond is generated by reacting the first reactive functional group with the second reactive functional group.

13. The lithium secondary battery of claim 5, wherein the coating layer of the separator comprises the inorganic compound and the polymer in a weight ratio in a range of about 1:0.2 to about 1:5.

14. The lithium secondary battery of claim 1, wherein adhesion strength between the coating layer and electrode is in a range of about 0.015 N/m to about 0.2 N/m.

15. The lithium secondary battery of claim 1, further comprising an electrolyte comprising a non-aqueous organic solvent and a lithium salt.

16. A lithium secondary battery, comprising:

a separator comprising a coating layer comprising an inorganic compound and a bonding organofunctional silane compound; and an electrode contacting the coating layer, and comprising an active material and a binder, wherein the bonding organofunctional silane compound and the binder of the electrode are chemically bonded to one another through a bridging group, the bridging group being the reaction product of a first reactive functional group of the bonding organofunctional silane compound and a second reactive functional group of the binder, wherein the bridging group is selected from the group consisting of —CONH—, —COO—, —N(H)COOC(O)—, —CH(OH)CH$_2$OC(O)—, —C(NH—R)OO—, —C(OH)N(H)—, —C(OH)C(O)—, —OC(O)N(H)—, —N(H)C(O)N(H)—, —SC(O)—, and a combination thereof, wherein R is an organic group, and wherein the inorganic compound is surface-treated with the bonding organofunctional silane compound.

17. A lithium secondary battery, comprising:

a separator comprising a coating layer, the coating layer comprising an inorganic compound, a polymer and an organic/inorganic bonding silane compound having a first reactive functional group; and an electrode contacting the coating layer, and comprising an active material and a binder having a second reactive functional group, wherein the first reactive functional group has reactivity with the second reactive functional group, and the lithium secondary battery comprises a chemical bond generated by reacting the first reactive functional group with the second reactive functional group, and wherein the chemical bond is included in a functional group selected from the group consisting of —CONH—, —COO—, —N(H)COOC(O)—, —CH(OH)CH$_2$OC(O)—, —C(NH—R)OO—, —C(OH)N(H)—, —C(OH)C(O)—, —OC(O)N(H)—, —N(H)C(O)N(H)—, —SC(O)—, and a combination thereof, wherein R is an organic group.

* * * * *